United States Patent [19]

Peterson

[11] 4,190,240
[45] Feb. 26, 1980

[54] CYLINDER HEAD SUPPORT WITH AIR CUSHION AND VACUUM HOLD DOWN

[75] Inventor: Bertil G. Peterson, Bloomington, Minn.

[73] Assignee: Tobin-Arp Manufacturing Company, Eden Prairie, Minn.

[21] Appl. No.: 896,889

[22] Filed: Apr. 17, 1978

[51] Int. Cl.² .............................................. B25B 11/00
[52] U.S. Cl. ..................................................... 269/21
[58] Field of Search ................. 269/20, 21, 22; 279/3; 408/76; 51/235; 60/407; 414/676

[56] References Cited

U.S. PATENT DOCUMENTS

| 2,855,653 | 10/1958 | Kastenbein | 269/21 |
| 3,209,623 | 10/1965 | Schardt | 51/235 X |
| 3,694,894 | 10/1972 | Jelinek et al. | 269/21 |
| 3,953,013 | 4/1976 | Griffith et al. | 269/21 |

Primary Examiner—Robert C. Watson
Attorney, Agent, or Firm—Kinney, Lange, Braddock, Westman and Fairbairn

[57] ABSTRACT

A machine tool, such as a machine for reconditioning the valve guide bores of automobile cylinder heads, includes a support member for holding a work piece and a table for supporting the support member. A plurality of orifices are provided for supplying air to or removing air from between the support member and the table. An operator-controlled valve selectively connects either an air source to the orifices to provide an air cushion which permits positioning of the support member with respect to the table, or connects a vacuum source to the orifices which holds the support member in a fixed position with respect to the table.

5 Claims, 3 Drawing Figures

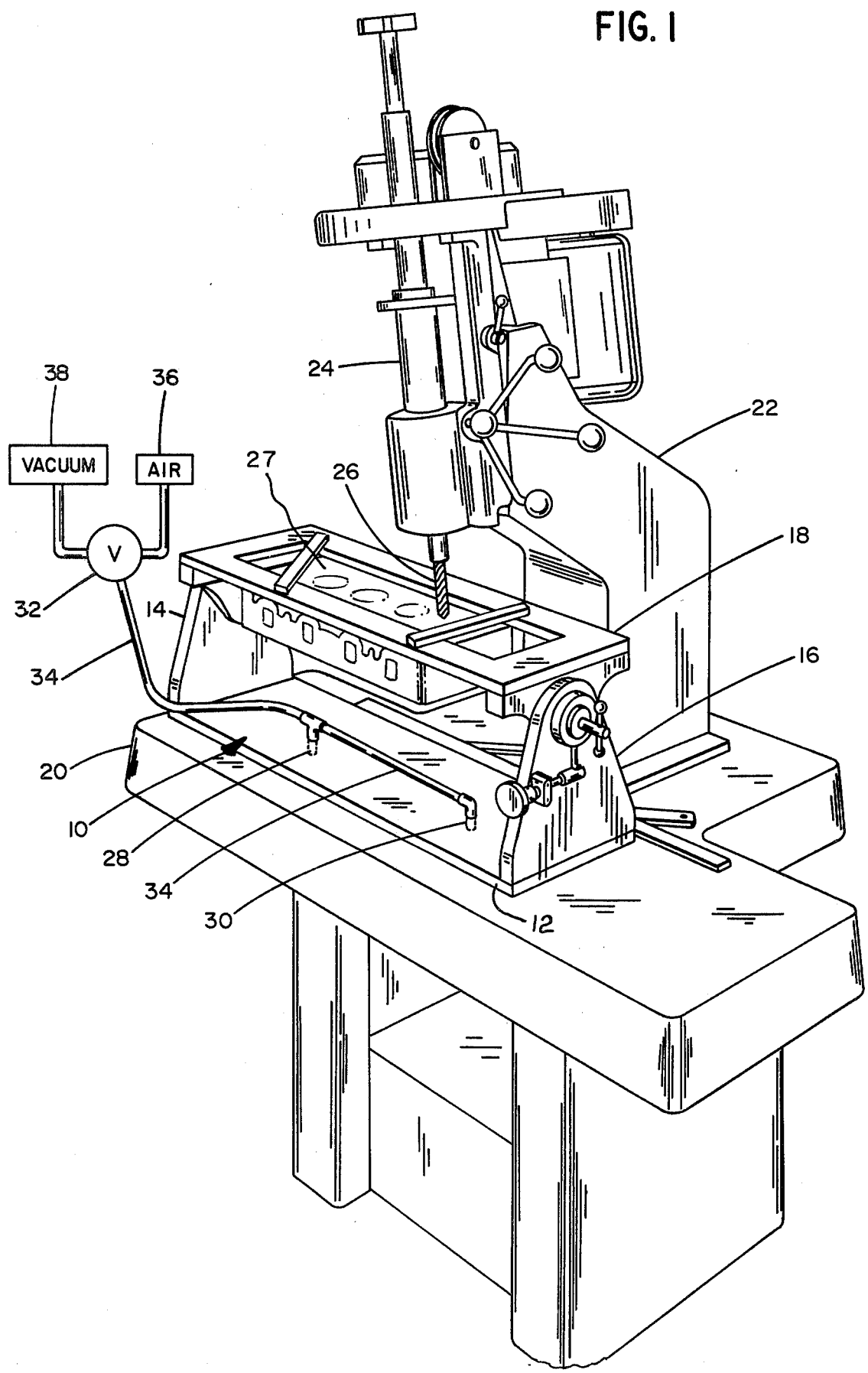

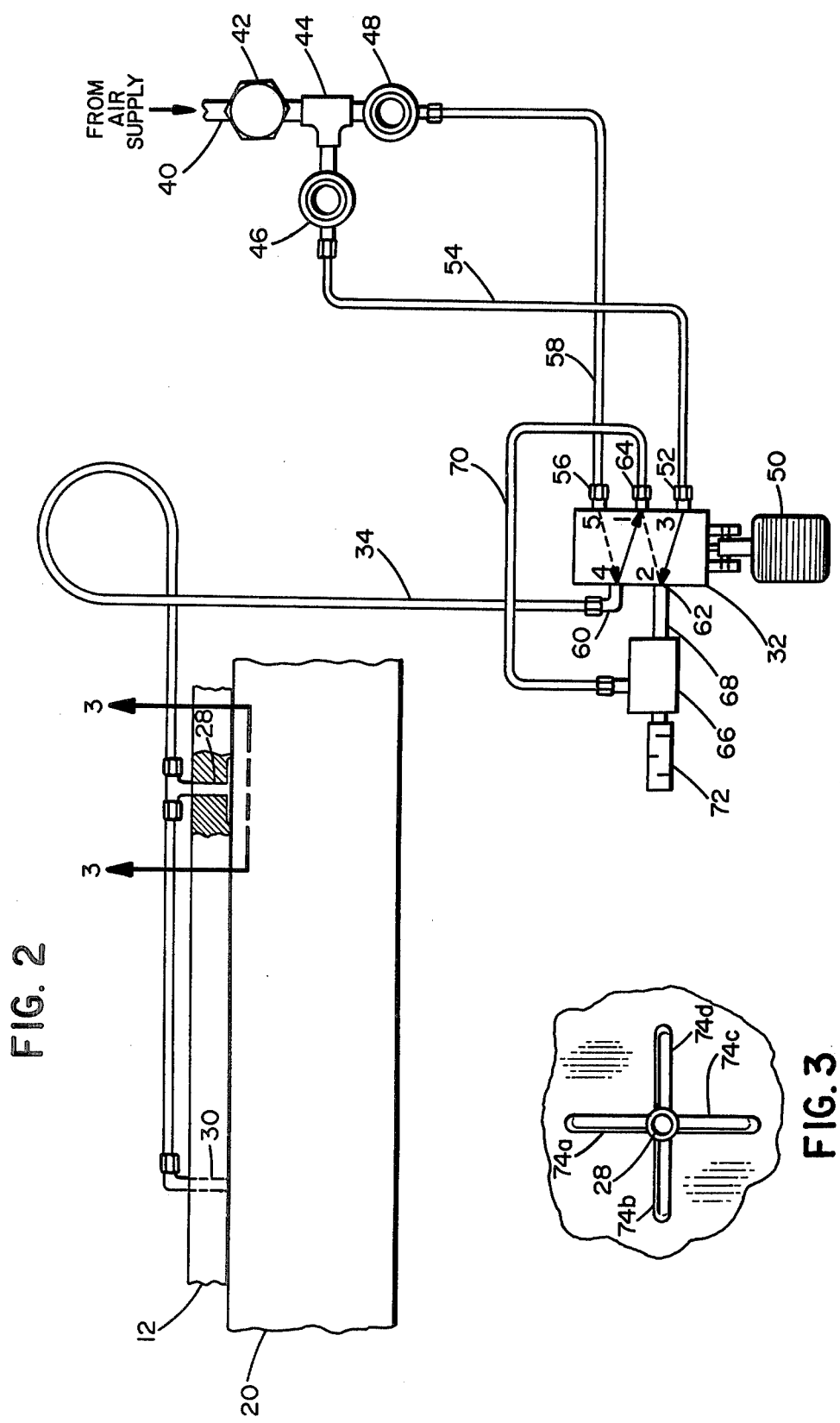

CYLINDER HEAD SUPPORT WITH AIR CUSHION AND VACUUM HOLD DOWN

BACKGROUND OF THE INVENTION

The present invention relates to machine tools. In particular, the present invention is an improved system for holding work pieces which combines an air cushion support of the work piece, and a vacuum hold down of the work piece.

In the past, some machine tools have been provided with air support structures in which a work piece is effectively floated on an air cushion over a work table. This permits easy movement of the work piece by the operator, and is particularly advantageous when a number of operations will be performed at different locations on the work piece. The air floatation systems, however, have the disadvantage that inaccuracies can result due to inadvertant movement of the work piece and work piece support with respect to the machine tool. An example of a prior art system having an air support is shown in U.S. Pat. No. 3,782,847.

Other prior art systems have been provided with various types of vacuum hold downs or vacuum chucks for holding a work piece securely in position while work is being performed. Examples of these prior art systems include U.S. Pat. Nos. 2,782,574; 3,233,887; and 3,790,153.

SUMMARY OF THE INVENTION

The present invention is an improved work piece support system for use with a machine tool. The system of the present invention includes a work piece support member for holding the work piece, a table for supporting the work piece support member, at least one orifice, an air source, a vacuum source, and an operator-controlled valve. The orifices are provided in either the platform or the table for supplying air to or removing air rom between the table and the support member. The operator-controlled valve selectively connects either the air source or the vacuum source to the orifices. When the air source is connected to the orifices, an air cushion is provided between the table and the support member which permits easy positioning of the support member with respect to the table. When the vacuum source is connected to the orifice, the vacuum is provided which securely holds the support member in a fixed position with respect to the table.

The present invention, therefore, provides both easy positioning of a work piece support member with respect to a table when adjustment of the position of the work piece with respect to the tool is desired, together with a vacuum hold down for securely holding the support member to the table during all other times. Inaccuracies in positioning which might otherwise occur as a result of use of an air cushion are minimized with the present invention.

BRIEF DESCRIPTION OF THE DRAWINGS

FIG. 1 shows a machine tool incorporating one embodiment of the present invention.

FIG. 2 is a schematic diagram of a preferred embodiment of the air cushion and vacuum hold down system of the present invention.

FIG. 3 shows a bottom view of one preferred embodiment of the base of a work piece support member.

DETAILED DESCRIPTION OF THE PREFERRED EMBODIMENTS

In FIG. 1, a machine tool used for holding and reconditioning valve guide bores in automobile cylinder heads is shown. This machine tool is generally similar to the tool described in co-pending patent applications Ser. Nos. 771,820 and 771,933 filed Feb. 24, 1977 and Feb. 25, 1977, respectively, which are assigned to the same assignee as the present application. The air cushion and vacuum hold down of the present invention has been incorporated in the machine tool shown in FIG. 1, but it should be understood that the present invention is also applicable to other machine tools which perform work on a work piece.

In FIG. 1, a support member 10 having a base 12, side supports 14 and 16, and a frame 18 is shown. Base 12 is supported by table 20, with the bottom surface of base 12 being generally parallel to a top surface of table 20.

A machine frame 22 is mounted to table 20 and supports a spindle 24, which drives a tool such as a reamer 26. The work piece 27, which is an automobile cylinder head, is held and clamped to frame 18.

As shown in FIG. 1, base 12 contains orifices 28 and 30 through which air can be supplied to or can be removed from the space between the bottom surface of base 12 and the top surface of table 20. Orifices 28 and 30 are connected to operator-controlled valve 32 which is operated to selectively connect either air source 36 or vacuum source 38 to orifices 28 and 30.

When air source 36 is connected through valve 32 to orifices 28 and 30, air of sufficient pressure is supplied to orifices 28 and 30 to create an air cushion which supports work piece support member 10 above table 20. This permits easy positioning of support member 10, and therefore the work piece, with respect to reamer 26.

When vacuum source 38 is connected through valve 32 to orifices 28 and 30, a vacuum is created between base 12 and table 20 which securely clamps the entire support member 10 to table 20. This prevents any movement of the support member 10 or the work piece with respect to reamer 26. Inaccuracies caused by shifts in the work piece position, therefore, are minimized by positively holding support member 10 in position.

In a preferred embodiment of the present invention, valve 32 has a normal position and an operator-actuated position. When it is in its normal position, valve 32 connects vacuum source 38 to orifices 28 and 30. Only when the operator actuates valve 32 to its operator-actuated position is air from air source 36 supplied through valve 32 to orifices 28 and 30. In other words, support member 10 is normally held securely to table 20, and only when the operator decides to shift the position of the work piece with respect to reamer 26 (and therefore actuates valve 32) is an air cushion provided which permits movement of support member 10.

FIG. 2 shows a preferred embodiment of the present invention. In this embodiment, air from a conventional air supply is provided to the system through air supply line 40. The air passes through air filter 42 and is then transmitted through "T" connector 44 to pressure regulators 46 and 48. In one preferred embodiment, the air supplied through line 40 has a pressure of approximately 100 PSI and 1.5 SCFM. Pressure regulator 46 reduces the pressure to 80 PSI and pressure regulator 48 reduces the pressure to about 30 PSI. Pressure regulator 48 is adjustable and is preferably mounted on the machine so that it can be adjusted as needed to provide sufficient pressure for supporting the support member 10 and work piece.

As shown in FIG. 2, valve 32 is preferably a foot pedal operated, two position, five port spool valve with a spring which returns the spool valve to a normal position whenever the foot pedal 50 is released. The output of pressure regulator 46 is connected to port 52 of valve 32 by supply line 54. Similarly, pressure regulator 48 is connected to port 56 by supply line 58.

Port 60 is connected through supply line 34 to orifices 28 and 30. Port 62 is connected to the air supply inlet of vacuum force transducer 66 by line 68, and port 64 is connected to the vacuum input of transducer 66 by line 70. The exhaust outlet of vacuum force transducer 66 is connected to air exhaust muffler 72.

In one preferred embodiment of the present invention, valve 32 is a "Nugget II" two-position, five port valve manufactured by C. A. Norgen Company, Littleton, Colorado. Vacuum force transducer 66 is preferably an AVR-093 vacuum force transducer manufactured by Air Vac Engineering Company, Inc., Milford, Connecticut.

The operation of the system of FIG. 2 is as follows. In its normal position, valve 32 causes a holding vacuum to be created between base 12 and table 20. In this normal position, air is supplied from pressure regulator 46 through line 54 to port 52. The air at port 52 (as illustrated by the solid line) passes through valve 32 to port 62 and then to the input of vacuum force transducer 66. This creates a holding vacuum at the vacuum inlet of transducer 66. In the normal position of valve 32, ports 60 and 64 are interconnected (as illustrated by the solid line) so that air from between base 12 and table 20 is drawn through orifices 28 and 30, through line 34 to port 60, through valve 32 to port 64, and through line 70 to the vacuum inlet of transducer 66. In other words, in the normal position, valve 32 causes air to be supplied from pressure regulator 46 to transducer 66 to create a vacuum, and connects orifices 28 and 30 to the vacuum inlet of transducer 66 to create a vacuum between base 12 and table 20.

When the operator depresses pedal 50, valve 32 interconnects ports 56 and 60, and ports 62 and 64, (as illustrated by broken lines). As a result, air from pressure regulator 48 is supplied through line 58 to port 56, through valve 32 to port 60, and through line 34 to orifices 28 and 30. The air pressure is sufficient to produce an air cushion between base 12 and table 20 which floats base 12 (and of course the work piece).

In the operator-actuated position, valve 32 effectively disconnects the vacuum transducer from exhaust ports 28 and 30. In particular, valve 32 connects the vacuum inlet and air supply inlets of transducer 66 together when the pedal 50 is depressed.

FIG. 3 shows a view of the bottom portion of base 12. As shown in FIG. 3, four channels 74a–74d, each approximately two inches long, which radiate from orifice 28. The purpose of channels 74a–74d is to distribute the air when pedal 50 is depressed, and to distribute the vacuum when pedal 50 is released and valve 32 is in its normal position. Orifice 30 has a similar group of channels for distributing the air cushion or vacuum.

In operation, pedal 50 is depressed by the operator whenever the operator decides to move the work piece with respect to reamer 26. Depressing pedal 50 causes an air cushion to be produced between base 12 and table 20, and allows the operator to effortlessly move supportive member 10 in any horizontal direction.

When support member 10 has been positioned in the desired location, as in the case of locating a cylinder head in a desired position under work spindle 14, the operator removes his foot from the pedal 50 so that air is transmitted from pressure regulator 46 through line 54 to port 52 of valve 32 and to the air supply inlet of vacuum transducer 66. The vacuum produced at the vacuum inlet of transducer 66 is connected through line 70 to port 64, through valve 32 to port 60, and through line 34 to orifices 28 and 30. This creates a vacuum which holds support base 12 securely to table 20. In a preferred embodiment, the bottom surface of base 12 and the top surface of table 20 mate sufficiently so that a vacuum of not less than 25 Hg is maintained, thereby producing a good holding ability for holding base 12 securely in position.

In conclusion, the present invention is a highly advantageous system for use with machine tools. The system provides both an air cushion when positioning the work piece with respect to the machine tool, and a vacuum hold down for holding the work piece support, and therefore the work piece, securely at all other times. The present invention can be implemented in a variety of machine tools, is simple and requires a relatively small number of parts, and is simple for the operator to operate.

Although the present invention has been described with reference to preferred embodiments, workers skilled in the art will recognize that changes may be made in form and detail without departing from the spirit and scope of the invention. For example, although two orifices, 28 and 30, were specifically shown, workers skilled in the art will recognize that the number of orifices may be varied depending upon the particular configuration, size and weight of the work piece support and work piece. Similarly, although the present invention has been described in the context of a particular machine tool, it is clearly applicable to other machine tools as well.

What is claimed is:

1. In a machine for performing work on a work piece, the improvement comprising:
   a support member for supporting a work piece;
   a table for supporting the support member;
   orifice means for supplying air to or removing air from between the support member and the table;
   an air source;
   a vacuum force transducer having an air supply inlet, a vacuum inlet, and an exhaust outlet; and
   operator-controlled valve means for selectively connecting the air source to the orifice means to provide an air cushion which permits positioning of the support member with respect to the table, or connecting the air source to the air supply inlet of the vacuum force transducer and the vacuum inlet to the orifice means to provide a vacuum which holds the support member in a fixed position with respect to the table.

2. The invention of claim 1 wherein the operator-controlled valve means has a normal position and an operator actuated position, and wherein the air source is connected to the air supply inlet and the vacuum inlet is connected to the orifice means when the operator-controlled valve means is in its normal position and the air source is connected to the orifice means when the operator-controlled valve means is in its operator actuated position.

3. The invention of claim 2 wherein the air source comprises:
- means for connection to a supply of air under pressures;
- first pressure regulator means for receiving the air under pressure and supplying air at a first pressure; and
- second pressure regulator means for receiving the air under pressure and supplying air at a second pressure.

4. The invention of claim 3 wherein the operator-controlled valve means has a first port connected to the vacuum inlet of the vacuum force transducer, a second port connected to the air supply inlet of the vacuum force transducer, a third port connected to the first pressure regulator means, a fourth port connected to the orifice means, and a fifth port connected to the second pressure regulator means; and wherein the operator-controlled valve means interconnects the first and fourth ports and interconnects the second and third ports when in its normal position, and interconnects the first and second ports and interconnects the fourth and fifth ports when in its operator actuated position.

5. The invention of claim 4 wherein the operator-controlled valve means is a foot pedal operated, two position, five port, spool valve with a spring which returns the spool valve to the normal position whenever the foot pedal is released.

* * * * *